US009435267B2

(12) United States Patent
Myer et al.

(10) Patent No.: US 9,435,267 B2
(45) Date of Patent: Sep. 6, 2016

(54) INTEGRATED HEALTH MANAGEMENT APPROACH TO PROPULSION CONTROL SYSTEM PROTECTION LIMITING

(71) Applicants: Rolls-Royce North American Technologies, Inc., Indianapolis, IN (US); Rolls-Royce Corporation, Indianapolis, IN (US)

(72) Inventors: Joseph D. Myer, Avon, IN (US); Richard J. Skertic, Carmel, IN (US); Keith A. Calhoun, Carmel, IN (US)

(73) Assignees: Rolls-Royce North American Technologies, Inc., Indianapolis, IN (US); Rolls-Royce Corporation, Indianapolis, IN (US)

( * ) Notice: Subject to any disclaimer, the term of this patent is extended or adjusted under 35 U.S.C. 154(b) by 176 days.

(21) Appl. No.: 14/204,619

(22) Filed: Mar. 11, 2014

(65) Prior Publication Data

US 2014/0277992 A1    Sep. 18, 2014

Related U.S. Application Data

(60) Provisional application No. 61/800,947, filed on Mar. 15, 2013.

(51) Int. Cl.
*F02C 9/00* (2006.01)
*B60C 11/24* (2006.01)
(Continued)

(52) U.S. Cl.
CPC .......... *F02C 9/00* (2013.01); *B60C 11/24* (2013.01); *F02D 41/2422* (2013.01); *G05B 23/0291* (2013.01); *H04B 1/7163* (2013.01); *H05B 33/083* (2013.01)

(58) Field of Classification Search
CPC ..... B60C 11/24; H04B 1/7163; H05B 33/083; F02D 41/2422
USPC .................................................. 701/100, 102
See application file for complete search history.

(56) References Cited

U.S. PATENT DOCUMENTS 7,065,433 B2    6/2006  Basu et al.
7,230,527 B2 *  6/2007  Basu ..................... G07C 5/006
                                                 340/506

(Continued)

FOREIGN PATENT DOCUMENTS

EP    2267305 A2    12/2010

OTHER PUBLICATIONS

International Search Report for PCT/US2014/023430 mailed Jul. 1, 2014.

*Primary Examiner* — Thomas G Black
*Assistant Examiner* — Wae Louie
(74) *Attorney, Agent, or Firm* — Fishman Stewart PLLC (57) ABSTRACT

A real-time engine management system having a controller system configured to control demand on a first component of an engine. The controller system is also configured to access a first set of prognostic data about the first component, where the first set of prognostic data includes a remaining lifespan approximation of the first component operating at a present operating condition. The controller system is also configured to identify a temporal length of an engine procedure operating at the present operating condition, alter a current limit constant associated with the first component to increase the remaining lifespan approximation of the first component beyond the temporal length, and implement the current limit constant associated with the first component so that the first component does not fault during the engine procedure.

20 Claims, 5 Drawing Sheets

(51) Int. Cl.
  *F02D 41/24* (2006.01)
  *H05B 33/08* (2006.01)
  *H04B 1/7163* (2011.01)
  *G05B 23/02* (2006.01)

(56) References Cited

U.S. PATENT DOCUMENTS

| | | | |
|---|---|---|---|
| 7,260,501 B2 * | 8/2007 | Pattipatti | G05B 23/0243 702/182 |
| 7,285,871 B2 | 10/2007 | Derouineau | |
| 7,308,322 B1 * | 12/2007 | Discenzo | G05B 23/0221 700/175 |
| 8,036,805 B2 | 10/2011 | Mahoney et al. | |
| 8,155,820 B2 | 4/2012 | Eklund et al. | |
| 8,165,146 B1 * | 4/2012 | Melick | H04B 1/7163 370/390 |
| 8,185,292 B2 * | 5/2012 | Litt | G01M 15/14 701/100 |
| 2004/0176887 A1 | 9/2004 | Kent et al. | |
| 2004/0267395 A1 * | 12/2004 | Discenzo | G05B 13/024 700/99 |
| 2005/0262838 A1 * | 12/2005 | Kageyama | E02F 9/20 60/453 |
| 2005/0273218 A1 * | 12/2005 | Breed | B60C 11/24 701/2 |
| 2006/0025897 A1 * | 2/2006 | Shostak | B60C 23/005 701/1 |
| 2006/0235707 A1 | 10/2006 | Goldstein et al. | |
| 2007/0135987 A1 * | 6/2007 | Coffey | F23Q 23/08 701/100 |
| 2008/0082345 A1 * | 4/2008 | Greiner | G06Q 10/06 705/305 |
| 2009/0138423 A1 | 5/2009 | Nwadiogbu et al. | |
| 2010/0042287 A1 | 2/2010 | Zhang et al. | |
| 2010/0286860 A1 | 11/2010 | Rowe et al. | |
| 2011/0029804 A1 | 2/2011 | Hadden et al. | |
| 2011/0046842 A1 | 2/2011 | Smith | |
| 2011/0137575 A1 * | 6/2011 | Koul | G05B 23/0245 702/34 |
| 2011/0245999 A1 | 10/2011 | Kordonowy | |
| 2011/0270484 A1 | 11/2011 | Grube | |
| 2012/0167590 A1 * | 7/2012 | Bettner | F02C 7/262 60/786 |
| 2014/0156165 A1 * | 6/2014 | Ewens | F02C 9/28 701/100 |
| 2014/0277991 A1 * | 9/2014 | Skertic | G05B 23/0289 701/100 |
| 2014/0277992 A1 * | 9/2014 | Myer | G05B 23/0291 701/100 |
| 2015/0163875 A1 * | 6/2015 | Yu | H05B 33/083 315/201 |
| 2015/0185111 A1 * | 7/2015 | Armstrong | G05B 23/0283 702/34 |

* cited by examiner

INTEGRATED HEALTH MANAGEMENT APPROACH TO PROPULSION CONTROL SYSTEM PROTECTION LIMITING

CROSS-REFERENCE TO RELATED APPLICATIONS

This application claims priority to U.S. Provisional Patent Application No. 61/800,947, filed Mar. 15, 2013, the contents of which are hereby incorporated in their entirety.

FIELD OF TECHNOLOGY

An improved health management approach for extending the life of a system is disclosed.

The improvements are applicable to engines such as turbines used for propulsive power in marine, land, air, and underwater applications, as examples.

BACKGROUND

It is often desirable to integrate prognostic tools into health management systems of a gas turbine system. For example, prognostic tools can be utilized to assess probability of failure of a system or one or more components thereof. Accordingly, one or more components of the system can be taken out of service before the probability of failure for such component(s) rises to unacceptable levels. However, this approach may result in discarding components that still have remaining life early. Accordingly, there is room for further improvements in this area.

BRIEF DESCRIPTION OF THE DRAWINGS

While the claims are not limited to a specific illustration, an appreciation of the various aspects is best gained through a discussion of various examples thereof. Referring now to the drawings, exemplary illustrations are shown in detail. Although the drawings represent the illustrations, the drawings are not necessarily to scale and certain features may be exaggerated to better illustrate and explain an innovative aspect of an example. Further, the exemplary illustrations described herein are not intended to be exhaustive or otherwise limiting or restricted to the precise form and configuration shown in the drawings and disclosed in the following detailed description. Exemplary illustrations are described in detail by referring to the drawings as follows:

DETAILED DESCRIPTION

An exemplary gas turbine engine and schematic of an electrical system coupled thereto are described herein and are shown in the attached drawings. The electrical system includes at least two generator circuits, one coupled to a high pressure portion of a gas turbine engine and the other coupled to a low pressure portion of the gas turbine engine.

Figure 1:
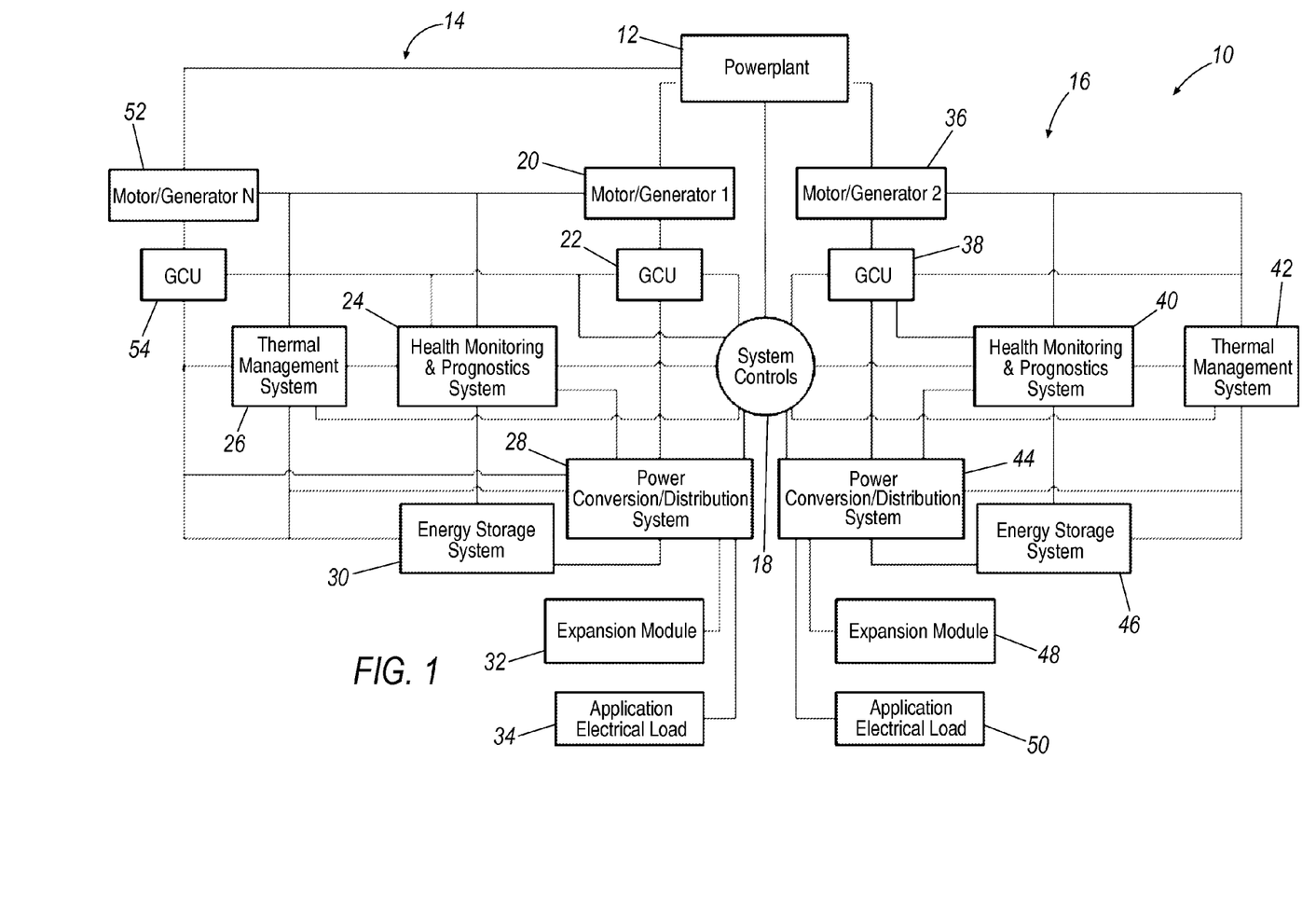
FIG. 1 is a schematic illustration of an electrical system coupled to a gas turbine engine, according to one example.

FIG. 1 illustrates an electrical system 10 in which a power plant or engine 12, such as a gas turbine engine, provides electrical power to a first power circuit 14 and a second power circuit 16. A system controller 18 is coupled to engine 12 and also to first and second circuits 14, 16. First power circuit 14 includes a motor/generator 20 and a General Control Unit (GCU) 22 coupled thereto. GCU 22 is also coupled to other components within first power circuit 14, such as a health monitoring and prognostics system 24, a thermal management system 26, and a power conversion/distribution system 28. First power circuit 14 also includes an energy storage system 30, an expansion module 32, and application electrical load(s) 34. System controller 18 is configured to regulate power flow (such as electrical currents and voltages within system 10) to provide power to various electrical busses. The power may be DC, AC, or conversion therebetween. System controller 18 may also be configured to execute computer program instructions to control the operation of engine 12, including fuel flow, or the position of any variable geometry systems (e.g., from the flight control system of an aircraft or from a steering system of a ship).

Health monitoring and prognostics system 24 monitors the health of system components, and is used to estimate component life based on sensor feedback received from components within engine 12. Thermal management system 26 includes pumps, expansion valves, and the like, as well as a controller, to provide coolant for the purposes of climate control, and other system operations. Power conversion/distribution system 28 receives electrical power from motor/generator 20 via GCU 22, and converts the power to a more useable form such as a DC voltage for storage in energy storage system 30, expansion module 32, and application electrical load(s) 34. The energy storage system 30 may include a battery or other energy storage system. Energy storage system 30 stores energy for providing power when engine 12 is not running (i.e., not generating power), but also to provide power to motor/generator 20 to provide starting power to engine 12 during startup. Expansion module 32 and application electrical load 34 represent additional electrical components that receive power from power conversion/distribution system 28.

Second power circuit 16 similarly includes a motor/generator 36 and a GCU 38 coupled thereto. GCU 38 is also coupled to other components within second power circuit 16, such as a health monitoring and prognostics system 40, a thermal management system 42, and a power conversion/distribution system 44. Second power circuit 16 also includes an energy storage system 46, an expansion module 48, and application electrical load(s) 50. The components 36-50 of second power circuit 16 are similarly arranged as described with respect to first power circuit 14. Additionally, in one example electrical system 10 includes one or more additional motor/generators 52 and corresponding GCUs 54 as well, which may be coupled to a gas turbine engine as will be further described. Thus, the system 10 is modular and flexible in that it may be expanded to include a number N of motor/generators based on contemplated operating conditions.

Figure 2:
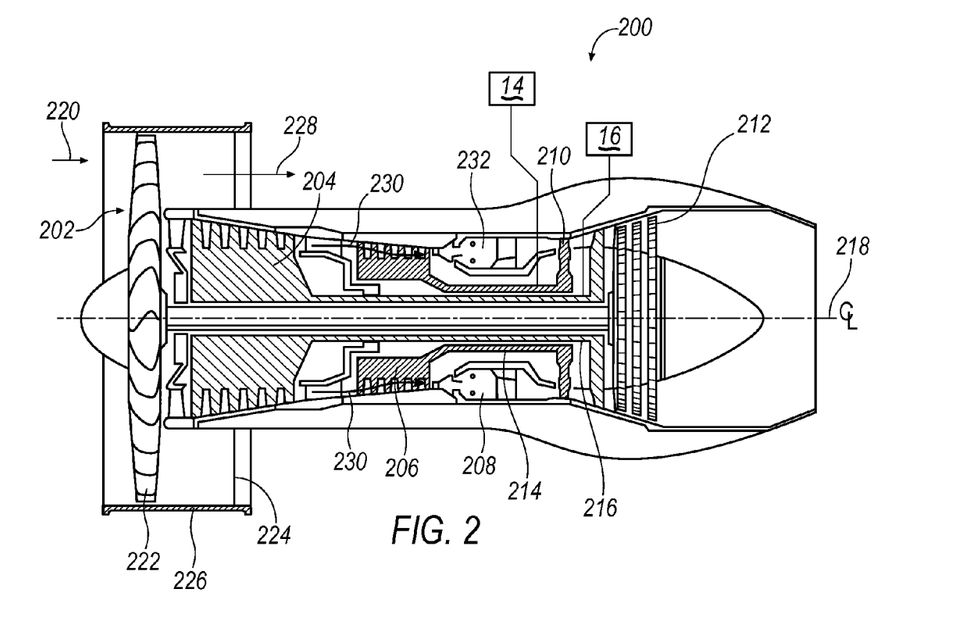
FIG. 2 illustrates an exemplary gas turbine engine that incorporates the electrical system illustrated in FIG. 1.

FIG. 2 illustrates a gas turbine engine 200, which includes a fan 202, a low pressure compressor and a high pressure compressor, 204 and 206, a combustor 208, and a high pressure turbine and low pressure turbine, 210 and 212, respectively. The high pressure compressor 206 is connected to a first rotor shaft 214 while the low pressure compressor 204 is connected to a second rotor shaft 216. The shafts extend axially and are parallel to a longitudinal center line axis 218. Ambient air 220 enters the fan 202 and is directed across a fan rotor 222 in an annular duct 224, which in part is circumscribed by fan case 226. Bypass airflow 228 provides engine thrust while a primary gas stream 230 is directed to a combustor 232 and the high pressure turbine 210.

First and second rotor shafts 214, 216, are coupled, respectively, to first and second power circuits 14, 16, as illustrated in FIG. 1. Thus, first and second power circuits 14, 16 are configured to split power between motor/generators 20, 36 so that each provides a portion of the power demand. As such, a power sharing/transfer arrangement between motor/generators 20, 36 provides the platform power demand, and includes a capability to provide power to one of the shafts 214, 216, as necessary. Such arrangement also provides an ability to optimize load shedding and a demand side management of the power requirement. Thus, life and performance considerations may be taken into account in real-time and optimized to actively seek and obtain performance optima while equipment is in operation.

Figure 3:
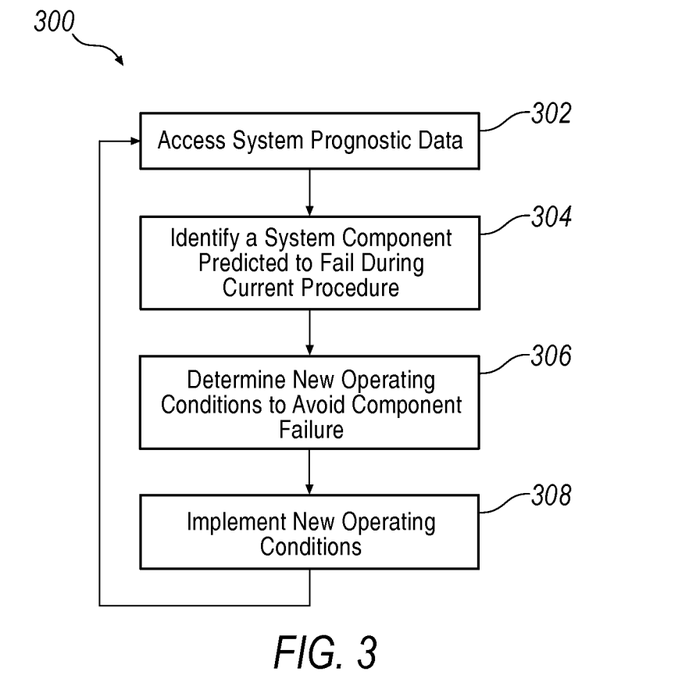
FIG. 3 is a flowchart depicting a technique for increasing the life of a system according to an embodiment.

Turning now to FIG. 3, a flowchart depicting a technique 300 for extending the life of a plant or system according to an embodiment is shown. The plant or system may take a variety of forms. For example, the plant or system could be a turbine engine of a plane, an oil extraction system, or a gas extraction system, among others. Technique 300 begins at block 302 where system component prognostic data is accessed. It is contemplated that prognostic data includes information pertaining to the remaining lifespan of components of the system as they operate during current system procedure.

After accessing prognostic data at block 302, process control proceeds to block 304 where, using the prognostic data, a system component predicted to fail during the current procedure is identified. For example, from the prognostic data, the predicted failure of fuel pump metering unit (FPMU) operating at current conditions may be identified. It is noted that the present procedure can take on a variety of forms. For example, the procedure may be a plane landing procedure or steady state operation of a plant. Further, it is also noted that the reasons for component failure are varied. For example, the predicted failure may be due to excessive usage or premature wear.

Referring back to technique 300, upon identifying 304 the predicted failure of a component, process control proceeds to block 306 to determine new operating conditions to avoid component failure. For example, if the FPMU is predicted to fail, process control may determine an alternate control method where current limit constants are modified to bring in upper and lower current limits to extend the life of the FPMU. In other words, new operating conditions are determined for the FPMU that will increase its lifespan beyond the length of the current procedure. Further details regarding the determination of a trim scheme (i.e., creations of new current limit constants) will be set forth in greater detail below with respect to FIG. 5.

Still referring to FIG. 3, when the new operating conditions are determined 306, process control proceeds to block 308 where the new operating conditions are implemented. For example, new current limit constants for maximum and minimum limit protection of a FPMU may be implemented. Accordingly, FPMU control commands may be saturated by the new limits to extend the life of the FPMU so the procedure can be completed. Though maximum and minimum current limits are discussed, it will be appreciated that other limits may be manipulated, such as transient limits and/or maximum and minimum hard limits, among others.

It is possible that the new upper and lower current limits may degrade the manner in which the system operates, but at the same time it allows the system to complete its current operation or procedure (e.g., landing a plane). In other words, the life of the system has been extended so that the system can complete a current operation, task, or mission.

Upon implementation 308 of the new operating conditions, process control returns to block 302 where prognostic data is again accessed and then to block 304 were the same or different component of the system is identified. Upon identifying the same or different component predicted to fail during a current system operation, technique 300 continues.

Technique 300 is accomplished in real-time and as such, component and/or system protection may be accomplished while the system is in use during a task or mission. That is, according to embodiments, the system is not taken off-station to determine current limit constants.

Figure 4:
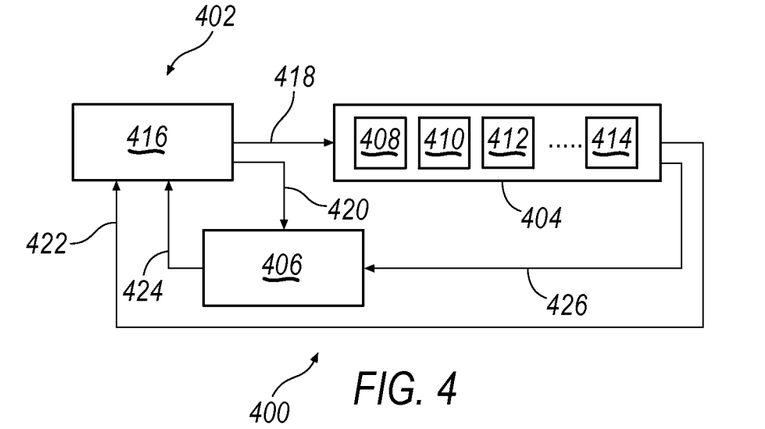
FIG. 4 is a block diagram illustration of a health management system configured to extend the life of a system according to an embodiment.

Referring now to FIG. 4, a block diagram of an environment 400 having a management system 402 for controlling operating conditions is shown according to an embodiment. In the present embodiment, the environment 400 includes the management system 402, a turbine system 404, and a prognostic unit 406. Further, according to the present embodiment, turbine system 404 includes a plurality of components 408-414 configured to effect thrust of turbine system 404 and controllable by management system 402. Though in the present embodiment, system 404 is considered a turbine system and components 408-414 are components that effect thrust on turbine system 404, turbine system 404 could be another system such as an oil extraction rig or a gas extraction rig and accordingly components 408-414 would be components relative to such systems. Further, it is contemplated that turbine system 404 or other systems could have more components than the four components 408-414 shown that are controllable by a management system such as management system 402. Indeed, systems or plants having less than four components controllable by a management system such as management system 402 are also contemplated.

Referring to the embodiment depicted in FIG. 4, management control system 402 is comprised of a single management controller 416. However, though not shown, it is contemplated that management system 402 may be comprised of more than one controller. Further, it is contemplated that prognostic unit 406 may be an integral part of management system 402 (see e.g., Health Monitoring and Prognostics System 24, FIG. 1) rather than a distinct unit as shown. As would be understood, in such an embodiment management control system 402 of FIG. 4 would also generate the prognostic data.

Referring to an embodiment shown in FIG. 4, management controller 416 sends command data 418 to turbine system 404. This command data 418 causes the plurality of components 408-414 to each act in a particular manner. Management controller 416 also sends substantially similar command data 420 to prognostic unit 406.

In addition to passing command data 418, 420 to turbine system 404 and prognostic unit 406, respectively, management controller 416 also receives sensor data 422 from turbine system 404 and prognostic data 424 from prognostic unit 406. Sensor data 422 includes information indicative of a state unique to each of components 408-414. Prognostic data 424, on the other hand, comprises information indicative of remaining life approximations at current operating conditions of each of the plurality of components 408-414. In other words, prognostic data 424 includes information about the level of degradation of each component 408-414 while each 408-414 is at respective operating conditions.

Prognostic unit 406 determines the remaining life approximations by comparing sensor data 426 from turbine system 404 with control demand data 420 from management controller 416. According to an embodiment, sensor data 426 received by prognostic unit 406 is substantially similar to sensor data 422 received by management controller 416.

Prognostic unit 406 may, for example, use an algorithm or real-time model (not shown) to compare the command data 420 (i.e., data that would have the affect of making components 408-414 each act in a particular manner such as command data 418) with sensor data 426 (i.e., data indicative of how components 408-414 responded to command data 418) to determine remaining life approximations of each component 408-414 of turbine system 404.

Management controller 416 employs the prognostic data 424 and sensor data 422 to determine individual current limit constants for components 408-414. For example, management controller 416 may determine, based on prognostic data 424 and sensor data 422 associated with component 408, that if component 408 continues to operate with its present maximum hard current limit it may fail during the present operation. Accordingly, management controller 416 determines a new maximum hard limit constant for component 408 that is lower than its present maximum hard current limit constant that will allow component 408 to complete its present operation. In other words, management controller 416 decreases the maximum hard current limit of component 408 so that component 408 does not fail during its present operation. Such a decreased maximum hard current limit may cause system/plant 404 to operate in a degraded fashion. At the same time, however, decreasing the maximum hard current limit for component 408 can stop component 408 from failing during an operation that in turn could cause the entire turbine system 404 to fail. Accordingly, management controller 416 has extended the life of the turbine system 404.

It is noted that in the present example though the maximum hard current limit constant discussed is associated with maximum hard limit protection, in other examples the current limit constant can be associated with other limits. For example, it will be appreciated that the current limit constant may be associated with minimum limit protection, transient limit protection, and/or minimum hard limits. Further, according to embodiments, current limit constant determinations for other components 410, 412, 414 are also determined. These components 410-414 along with component 408 may, for example, be a fan rotor (see e.g., fan rotor 222, FIG. 2), a pressure component associated with EPR control, a pressure component associated with TPR control, or an FPMU.

Figure 5:
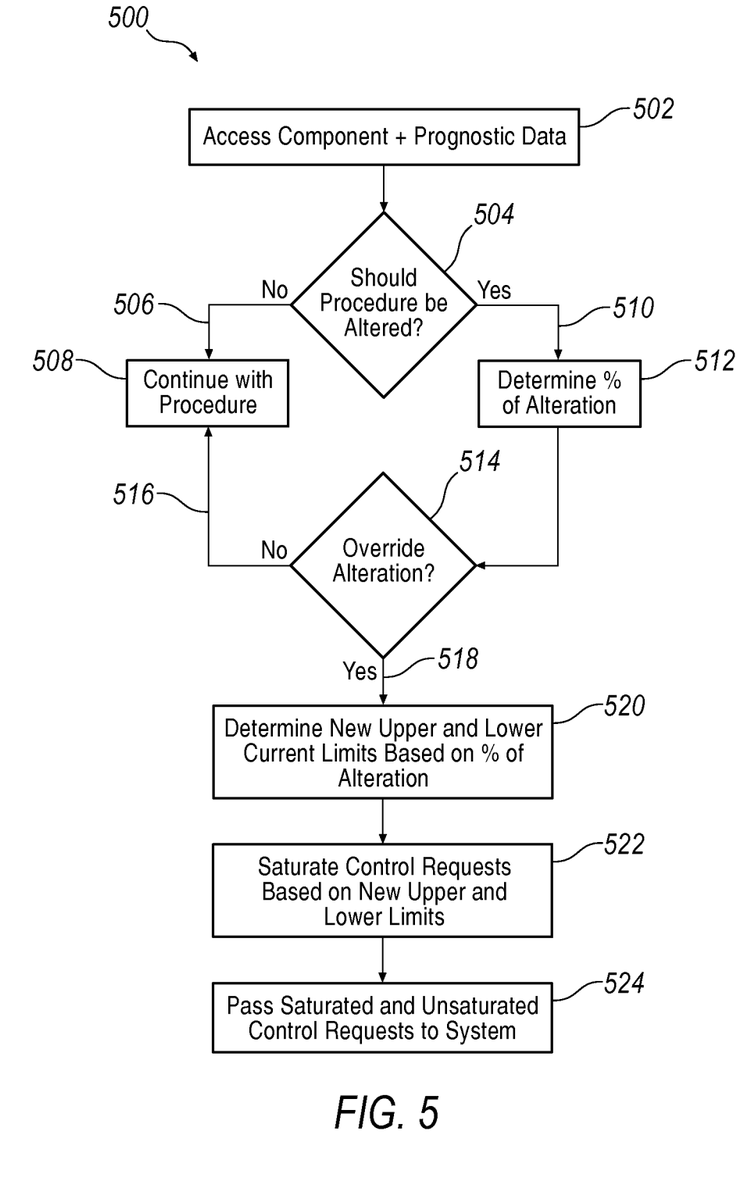
FIG. 5 is another technique for increasing the life of a system according to an embodiment.

Referring now to FIG. 5, a technique 500 for protecting a plant or system from fault is shown according to an embodiment. Starting at block 502, process control accesses prognostic data, where such data includes information indicative of the remaining life span or level of degradation of plant or system components operating at present conditions. That is, the prognostic data determines the length of time a component can function at current operating conditions before failing. Process control then proceeds to decision block 504 to determine whether, in light of the prognostic data, the procedure will continue without alterations. For example, it may be determined from the prognostic data that components of a plant or system are operating at a level that allows them to complete the current procedure, mission, or task without failure or fault. In such an instance, it is determined 506 that operation of components of the system should not be altered and process control proceeds to block 508 where the procedure continues with present component controls. A procedure, mission, or task may take a variety of forms. For example, a procedure could be the generation of thrust from a gas turbine engine in a plane, the operation of an oil rig, or a mission of an aerial drone or the like.

Still referring to FIG. 5, if the time needed to complete the current procedure is greater than the projected lifespan of the component in question, then process control determines 510 that the procedure should be altered and process control proceeds to block 512 where the percentage of procedure alteration or degradation is determined. Upon determining the percentage of alteration or degradation, process control proceeds to decision block 514, where it is determined whether or not the alteration will be overridden. For example, a system operator such as a pilot or a plant control manager may decide 516 to override the alteration. In such a case, process control proceeds to block 508, where the current procedure continues at levels that are not altered.

Alternatively, it may be determined 518 that alteration of operating levels will proceed and accordingly new upper and lower current limits are created based on the percentage of alteration determined at block 512. In other words, new current limit constants are determined 520 for the component with the poor predicted lifespan. It is these new current limits that will alter the procedure. It is contemplated that the new upper limit is created by multiplying the old upper current limit constant by a Boolean or factor in order to reach the determined percentage of alteration. It will be appreciated that whether or not a factor or Boolean will be utilized to determine the new upper current limit constant will be depend on the type of limit being determined. Further, according to an embodiment, the new lower limit is determined by multiplying the upper limit by negative one. Other embodiments are also contemplated where a unique Boolean or factor other than negative one is used to determine the new lower limit.

Upon determining 520 the new upper and lower limits, process control proceeds to block 522 were relevant control demands are saturated. For example, it may have been determined 510 that a fan assembly rotor speed operation should be degraded so that a plane turbine engine (i.e., a plant or system) will not fail and the plane can safely land. In other words, the rotor speed operation should be degraded so that the plane can complete its task or mission. If the pilot does not override 518 the degradation, new upper and lower rotor speed limits are determined 520 and the current and future rotor speed commands that go outside the new upper and lower boundaries will be saturated 522. Accordingly, the rotor speed operation has been altered or degraded to prevent failure of the rotor and/or the plane turbine engine.

Technique 500 employs prognostic data along with a least wins logic while a system or plant is in working operation. That is, the system or plant does not need to be taken off task or off-station to determine new upper and lower limits. In other words, in the context where the system is a plane's turbine engine, the new limits can be determined and implemented on wing.

It is contemplated that technique 500 as well as technique 300 of FIG. 3 be carried out by a control and/or management system having one or more controllers such as those discussed with respect to FIGS. 1 and 4.

Figure 6:
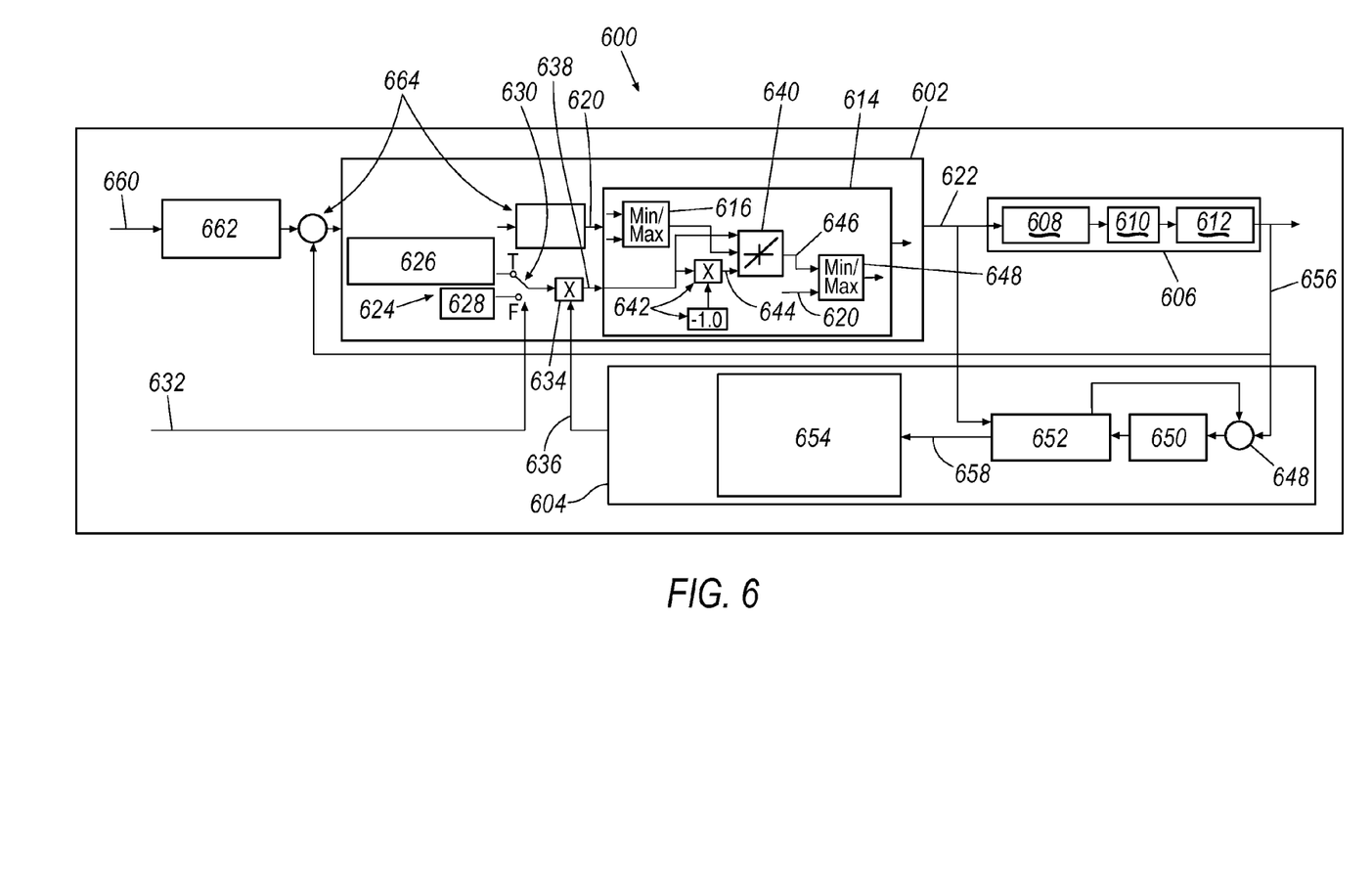
FIG. 6 is a block diagram depicting a control scheme 600 implementing aspects of technique 300 of FIG. 3 and technique 500 of FIG. 5 are shown according to an embodiment.

Turning now to FIG. 6, a block diagram depicting a control scheme 600 implementing aspects of technique 300 of FIG. 3 and technique 500 of FIG. 5 are shown according to an embodiment. The control scheme 600 employs prognostic information to alter in real-time one or more current limits to extend the life of a system or plant.

Control scheme 600 of FIG. 6 depicts a set of management logic 602 and a set of prognostic logic 604 such as integrated model based prognostic logic and the interaction of each 602, 604 with a system 606. System 606 includes a plurality of actuators 608, a plant 610, and a plurality of sensors 612. It will be appreciated that, though not shown, the actuators 608 and sensors 612 could be an integral part of the plant 610. That is, rather than the plant 610 being distinct from the actuators 608 and the sensors 612 as depicted in FIG. 6, the actuators 608 and sensors 612 may be an integral part (not shown) of the plant 610.

Referring to the embodiment depicted in FIG. 6, the management logic 602 and prognostic logic 604 are employed to extend the life of the system 606. It will be appreciated by one skilled in the art that the management logic 602 may be implemented in one or more controllers. Likewise, the prognostic logic 604 may be implemented in one or more controllers or the same controller(s) as the prognostic logic 604.

According to the present embodiment, the management logic 602 includes a set of alteration logic 614 to alter a set of active current limits 616 to produce an altered set of active current limits 618. The altered set of active current limits 618 saturate input commands 620 to produce control commands 622 that will not cause one or more actuators 608 (i.e., components) of system 606 to fail. It is noted that the control scheme 600 includes a set of override logic 624 that allows a user such as a pilot to override the alteration of the active current limits 616. The override logic 624 includes a first notification 626, a second notification 628, and a selection switch 630. The selection switch 630 is controlled by a user input 632. Further information regarding the override logic 624 will be set forth in detail below.

As depicted in the control scheme 600, the management logic 602 includes a set of alteration proposal logic 634 that receives a set of prognostic data 636 from the prognostic logic 604. The prognostic data 636 includes remaining life limit approximations about one or more components of the system 606. By utilizing the prognostic data 636, the alteration proposal logic 634 identifies a component of the system 606 that is predicted to fail during an active procedure or mission. Furthermore, the alteration proposal logic 634 determines an alteration scheme that will allow the system 606 to complete the mission. According to an embodiment, this alteration scheme is set forth as a percentage of alteration or degradation of system operation. In other words, the alteration proposal logic 634 proposes a plan that will alter or degrade the operation of the system 606 so that the system 606 or components (e.g., actuators 608) thereof do not fail during operation.

The override logic 624 presents the proposed alteration to a user (not shown) via the first notification 626. According to an embodiment, the first notification 626 notifies the user that an "X" percentage of system operation degradation is proposed. The second notification 628 effectively informs the user that the proposed degradation can be overridden so that the system 606 will operate at one hundred percent. The user input 632 determines whether the degradation will be overridden.

According to the embodiment depicted in FIG. 6, the user input 632 did not override the proposed alteration. As such, the selection switch 630 of override logic 624 is set to "T" (true).

Since the proposed alteration was not overridden, the alteration proposal logic 634 passes proposed alteration data 638 to the saturation logic 640, where the proposed alteration data 638 sets forth a Boolean or value. Accordingly, the proposed alteration data 638 passed to the saturation box 640 serves as altered upper limit data. The proposed alteration data 638 is also multiplied by a factor of negative one, as shown by a set of lower limit logic 642, to set forth altered lower limit data 644 that is also passed to the saturation box 640. The saturation box 640 also receives active current limits 616. Accordingly, altered current limit constant data 646 are output from the saturation box 640 and set forth as the altered current limits 618.

The input commands 620 are then passed through these altered current limits 618 and any of the inputs that would cause a current flow above the altered maximum altered current limit or below the altered minimum current limit is saturated so as not to cause a fault in system 606, effectively extending the life of the system 606.

With reference to prognostic information such as prognostic data 636, it is noted that a variety of prognostic logic can be employed to determine such prognostic data 636. In the embodiment depicted in FIG. 6, the prognostic logic 604 includes a set of prognostic summation logic 648, a tracking filter 650, a real-time engine model 652, and a set of gradient search optimization prognostics and engine management algorithms 654.

Control demands 622 are input into the real-time engine model 652 while sensor data 656 associated with the control demands 622 is input into the prognostic summation logic 648. One skilled in the art will appreciate that with the control demand and sensor data 622, 656, respectively, matched outputs 658 are determined. Matched outputs 658 are then input into the optimization prognostics and engine management algorithms 654, where the remaining life limit data (i.e., prognostic data 636) is determined. As discussed in detail above, the prognostic data 636 is employed by the management logic 602 to identify a failing component or actuator (i.e., an actuator of the plurality of actuators 608) so that current limits associated with that component or actuator 608 thereof can be altered in real-time to extend the life of the system 606. By implementing the control scheme 600 in real-time, the need to take the system 606 or plant 610 off-station for analysis is avoided.

It is noted that a thrust command 660, a power management module 662 and a set of control law logic 664 are shown to serve as an exemplary illustration of the interface between portions of an existing health management system (i.e., the power management module 660 and control law logic 662) with the management logic 602.

It will be appreciated that though the control scheme 600 depicts the alteration of both a lower (i.e., a minimum) and an upper (i.e., a maximum) limit, alternate control scheme embodiments may only alter only a lower or upper limit.

Computing devices such as system 10 of FIG. 1 generally include computer-executable instructions such as the instructions of the system controller 18, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, C#, Objective C, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. An engine system comprising:
   a controller system that controls demand on a first component of an engine, wherein the controller system includes at least one controller and is configured to:
      access a first set of prognostic data about the first component, wherein the first set of prognostic data includes a remaining lifespan approximation of the first component operating at a present operating condition;
      identify a temporal length of an engine procedure operating at the present operating condition;
      decrease a maximum hard current limit of the first component to increase the remaining lifespan approximation of the first component beyond the temporal length; and
      implement the current limit constant associated with the first component so that the first component does not fault during engine operation.

2. The system as claimed in claim 1, wherein the engine provides propulsive power in a transportation vehicle.

3. The system as claim in claim 1, the controller system further generates the first set of prognostic data.

4. The system as claimed in claim 1, the controller system further receives a user input to override the implementation of the current limit constant associated with the first component.

5. The system as claimed in claim 1, wherein the first component is a fuel pump metering unit.

6. The system as claimed in claim 1, the system further alters an additional current limit constant associated with the first component to increase the remaining lifespan approximation of a second component beyond the temporal length.

7. The system as claimed in claim 1, wherein the system further:
   accesses a second set of prognostic data associated with a second component of the engine, wherein the second set of prognostic data associated with the second component includes a remaining lifespan approximation of the second component operating at the present operating condition;
   alters a current limit constant associated with the second component to increase the remaining lifespan approximation of the second component beyond the temporal length; and
   implements the current limit constant associated with the second component so that the second component does not fault during engine operation.

8. A system comprising:
   an engine having a plurality of components each respectively configured to carry out a plurality of engine tasks;
   a controller that manipulates operating conditions of each the plurality of components; and
   a computer with a processor that:
      identifies a first component predicted to fail during an active engine operation from the plurality of components;

determines at least one new operating condition for the first component such that when implemented by the controller the first component will no longer be predicted to fail, where the at least one new operating condition includes a new maximum hard limit constant that is lower than a present maximum hard current limit; and causes the controller to implement the at least one new operating condition so that the first component is no longer predicted to fail during the active operation.

9. The system claimed in claim 8, wherein the at least one new operating condition is a new current limit constant.

10. The system claimed in claim 8, wherein the processor indicates that the first component will fail during the active engine operation.

11. The system claimed in claim 8, wherein the at least one new operating condition saturates current passed through the first component.

12. The system claimed in claim 8, wherein the at least one new operating condition is a new first and second current limit constant.

13. A method comprising:
identifying, by way of a processor, a first engine component that is predicted to fail during an active on-station operation, wherein identifying the first engine component occurs during the active on-station procedure;

decreasing, by way of the processor, a first maximum hard current limit constant during the active on-station procedure to provide a new first engine component limit protection to the first engine component, wherein decreasing the first maximum hard current limit constant alters the active on-station procedure to an altered active on-station procedure; and determining, by way of the processor, that the first engine component working under the new first engine component limit protection is predicted to successfully perform during the altered active on-station procedure.

14. The method of claim 13, further comprising generating a set of prognostic data about the first component.

15. The method of claim 14, wherein the identifying the first engine component that is predicted to fail is based on generating the set of prognostic data about the first component.

16. The method claimed in claim 13 further comprising;
identifying a second engine component that is predicted to fail during the active on-station procedure, wherein identifying the second engine component occurs during the active on-station procedure;

adjusting a second current limit constant during the active on-station procedure to provide a new second engine component limit protection to the second engine component, wherein adjusting the second current limit constant alters the altered active on-station procedure to a second altered active on-station procedure; and determining that the second engine component is predicted to successfully perform during the second altered active on-station procedure.

17. The method of claim 16 further comprising generating a set of prognostic data associated with the second component.

18. The method of claim 13, wherein the first engine component is a fuel pump metering unit.

19. The method of claim 13, wherein decreasing the first maximum hard current limit constant employs a least wins logic scheme.

20. The method as claimed in claim 13, further comprising receiving a user input to override the new first engine component limit protection.

* * * * *

UNITED STATES PATENT AND TRADEMARK OFFICE
CERTIFICATE OF CORRECTION

PATENT NO. : 9,435,267 B2  
APPLICATION NO. : 14/204619  
DATED : September 6, 2016  
INVENTOR(S) : Joseph D. Myer et al.

Page 1 of 2

It is certified that error appears in the above-identified patent and that said Letters Patent is hereby corrected as shown below:

In the Claims

At Column 10, Claim number 3, Line number 31, add "ed" to "claim".

At Column 10, Claim number 8, Line number 62, add "of" after "each".

At Column 11, Claim number 9, Line number 11, add "as" after "system".

At Column 11, Claim number 10, Line number 13, add "as" after "system".

At Column 11, Claim number 11, Line number 16, add "as" after "system".

At Column 11, Claim number 12, Line number 19, add "as" after "system".

At Column 12, Claim number 14, Line number 3, replace "of" with "as claimed in".

At Column 12, Claim number 15, Line number 5, replace "of" with "as claimed in".

At Column 12, Claim number 16, Line number 9, add "as" after "method".

At Column 12, Claim number 16, Line number 9, add "," after "13".

At Column 12, Claim number 16, Line number 9, change ";" to ":".

At Column 12, Claim number 17, Line number 23, replace "of" with "as claimed in".

At Column 12, Claim number 17, Line number 23, add "," after "16".

Signed and Sealed this  
Seventh Day of March, 2017

Michelle K. Lee  
*Director of the United States Patent and Trademark Office*

CERTIFICATE OF CORRECTION (continued)
U.S. Pat. No. 9,435,267 B2

At Column 12, Claim number 18, Line number 26, replace "of" with "as claimed in".

At Column 12, Claim number 19, Line number 28, replace "of" with "as claimed in".